United States Patent
Sato et al.

(10) Patent No.: US 10,037,852 B2
(45) Date of Patent: Jul. 31, 2018

(54) CAPACITOR UNIT AND CAPACITOR CASING STRUCTURE

(71) Applicant: HONDA MOTOR CO., LTD., Tokyo (JP)

(72) Inventors: Shinnosuke Sato, Wako (JP); Tomoaki Ono, Wako (JP); Atsushi Amano, Wako (JP); Kosuke Nishiyama, Wako (JP); Koshiro Fuchibe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 5 days.

(21) Appl. No.: 15/414,621

(22) Filed: Jan. 25, 2017

(65) Prior Publication Data

US 2017/0221633 A1    Aug. 3, 2017

(30) Foreign Application Priority Data

Jan. 29, 2016   (JP) .................................. 2016-015057

(51) Int. Cl.
*H01G 4/38* (2006.01)
*H01G 2/04* (2006.01)
(Continued)

(52) U.S. Cl.
CPC ................. *H01G 4/38* (2013.01); *H01G 2/04* (2013.01); *H01G 2/08* (2013.01); *H01G 9/0003* (2013.01);
(Continued)

(58) Field of Classification Search
CPC .. H01G 4/38; H01G 2/04; H01G 2/08; H01G 9/0003; H01G 9/28; H01G 11/10; H01G 11/18; H01G 11/82; Y02E 60/13
(Continued)

(56) References Cited

U.S. PATENT DOCUMENTS

2007/0002594 A1 *  1/2007  Otsuka .................. H02M 7/003
                                                    363/37

FOREIGN PATENT DOCUMENTS

JP       2000-243435      9/2000
JP       2004-349473     12/2004
(Continued)

OTHER PUBLICATIONS

Japanese Office Action for corresponding JP Application No. 2016-015057, dated Jan. 9, 2018 (w/ English machine translation).

*Primary Examiner* — Michael P McFadden
(74) *Attorney, Agent, or Firm* — Mori & Ward, LLP

(57) ABSTRACT

A capacitor unit includes a casing, a heat sink, a heat radiation sheet, and a notch. The casing accommodates the capacitors. The casing includes a positive electrode terminal block and a negative electrode terminal block. The heat sink is provided on the casing in a stacking direction. The heat radiation sheet is made of insulation material and is sandwiched in the stacking direction between the casing and the heat sink to cover the positive electrode terminal block and the negative electrode terminal block. The notch is provided in at least one of the casing and the heat radiation sheet between the negative electrode terminal block and the positive electrode terminal block. The notch passes through the at least one of the casing and the heat radiation sheet along a plain substantially perpendicular to the stacking direction to separate the negative electrode terminal block and the positive electrode terminal block.

9 Claims, 5 Drawing Sheets

(51) Int. Cl.
*H01G 2/08* (2006.01)
*H01G 9/00* (2006.01)
*H01G 9/28* (2006.01)
*H01G 11/10* (2013.01)
*H01G 11/18* (2013.01)
*H01G 11/82* (2013.01)

(52) U.S. Cl.
CPC ............... *H01G 9/28* (2013.01); *H01G 11/10* (2013.01); *H01G 11/18* (2013.01); *H01G 11/82* (2013.01); *Y02E 60/13* (2013.01)

(58) Field of Classification Search
USPC ...................................... 361/274.3, 316, 318
See application file for complete search history.

(56) References Cited

FOREIGN PATENT DOCUMENTS

| | | |
|---|---|---|
| JP | 2007-081250 | 3/2007 |
| JP | 2008-204990 | 9/2008 |

\* cited by examiner

CAPACITOR UNIT AND CAPACITOR CASING STRUCTURE

CROSS-REFERENCE TO RELATED APPLICATIONS

The present application claims priority under 35 U.S.C. § 119 to Japanese Patent. Application No. 2016-015057, filed Jan. 29, 2016. The contents of this application are incorporated herein by reference in their entirety.

BACKGROUND OF THE INVENTION

Field of the Invention

The present invention relates to a capacitor unit and a capacitor casing structure.

Discussion of the Background

A capacitor unit that includes a casing accommodating a plurality of capacitor elements is widely used while being assembled to various control circuits. Further, the capacitor elements generate heat when the elements are used. Recently, a heat radiation structure or a cooling structure capable of radiating the heat as much as possible is proposed. For example, as disclosed in Japanese Patent Application Publication No. 2004-349473, there is known a structure in which a casing accommodating the capacitor elements is disposed on a heat sink with an insulation heat radiation sheet interposed therebetween.

SUMMARY OF THE INVENTION

According to a first aspect of the present invention, a capacitor unit includes capacitors, a casing, a heat sink, a heat radiation sheet, and a notch. The capacitors include positive electrodes and negative electrodes. The casing accommodates the capacitors. The casing includes a positive electrode terminal block and a negative electrode terminal block. The positive electrode terminal block has a positive electrode terminal which is electrically connected to the positive electrodes of the capacitors. The negative electrode terminal block has a negative electrode terminal which is electrically connected to the negative electrodes of the capacitors. The heat sink is provided on the casing in a stacking direction to radiate heat from the capacitors. The heat radiation sheet is made of insulation material. The heat radiation sheet is sandwiched in the stacking direction between the casing and the heat sink to cover the positive electrode terminal block and the negative electrode terminal block. The notch is provided in at least one of the casing and the heat radiation sheet between the negative electrode terminal block and the positive electrode terminal block. The notch passes through the at least one of the casing and the heat radiation sheet along a plain substantially perpendicular to the stacking direction to separate the negative electrode terminal block and the positive electrode terminal block.

According to a second aspect of the present invention, a capacitor casing structure includes a casing, a heat sink, a heat radiation sheet, and a notch. The casing accommodates capacitors. The casing includes a positive electrode terminal block and a negative electrode terminal block. The positive electrode terminal block has a positive electrode terminal to be electrically connected to positive electrodes of the capacitors. The negative electrode terminal block has a negative electrode terminal to be electrically connected to negative electrodes of the capacitors. The heat sink is provided on the casing in a stacking direction to radiate heat from the capacitors. The heat radiation sheet is made of insulation material and is sandwiched in the stacking direction between the casing and the heat sink to cover the positive electrode terminal block and the negative electrode terminal block. The notch is provided in at least one of the casing and the heat radiation sheet between the negative electrode terminal block and the positive electrode terminal block. The notch passes through the at least one of the casing and the heat radiation sheet along a plain substantially perpendicular to the stacking direction to separate the negative electrode terminal block and the positive electrode terminal block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
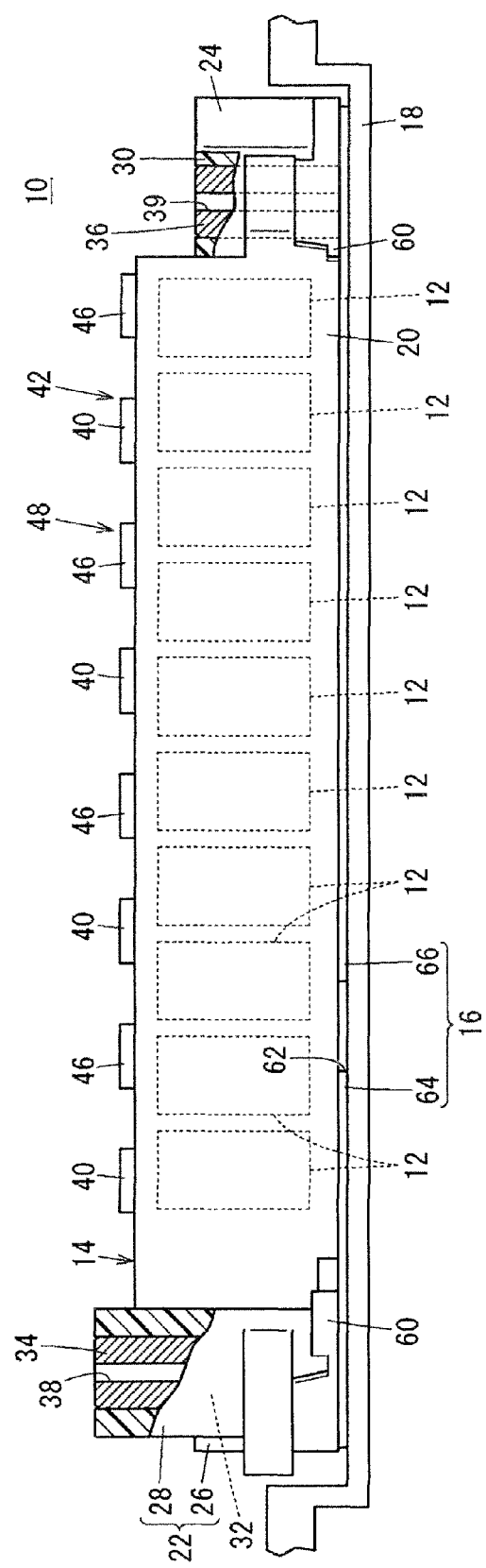
FIG. 1 is a schematic cross-sectional view illustrating a part of a front face of a capacitor unit according to an embodiment of the invention.

The embodiments will now be described with reference to the accompanying drawings, wherein like reference numerals designate corresponding or identical elements throughout the various drawings.

Hereinafter, preferred embodiments of a capacitor unit according to the invention will be described in detail with reference to the accompanying drawings.

FIG. 1 is a schematic front view illustrating a capacitor unit 10 according to the embodiment. The capacitor unit 10 includes a capacitor element 12 and a casing 14 accommodating the capacitor element 12. The casing 14 is disposed on a heat sink 18 with a heat radiation sheet 16 interposed therebetween. Hereinafter, an end face near the heat sink 18 will be referred to as a "bottom face" and the opposite side thereof will be referred to as a "top face".

In the embodiment, ten capacitor elements 12 are disposed in parallel inside the casing 14 as indicated by the dashed line. For this reason, the casing 14 includes a main body 20 which is formed in a substantially elongated rectangular parallelepiped shape, a first terminal block 22 which is provided at one end of the main body 20, and a second terminal block 24 which is provided at the other end thereof. The first terminal block 22 is formed in such a manner that a positive electrode terminal block 26 extending in the vertical direction is connected to a first negative electrode terminal block 28 which is slightly longer than the positive electrode terminal block 26. Meanwhile, the second terminal block 24 only includes a second negative electrode terminal block 30.

The positive electrode terminal block 26 accommodates a positive electrode terminal 32 formed of metal. Similarly, the first negative electrode terminal block 28 and the second negative electrode terminal block 30 also respectively accommodate a first negative electrode terminal 34 and a second negative electrode terminal 36 (see FIG. 2) formed of metal. The positive electrode terminal 32, the first negative electrode terminal 34, and the second negative electrode terminal 36 are respectively provided with screw holes 38 and 39 (see FIG. 1) directed from top faces toward bottom faces. Additionally, a screw hole of the positive electrode terminal 32 is not illustrated in the drawings.

The positive electrodes of the capacitor elements 12 are electrically connected to one another through a positive electrode busbar 42 having four positive electrode tab portions 40. Further, a first tab portion of a positive electrode conductive plate (not illustrated) overlaps the positive electrode tab portion 40. A through-hole 44 (see FIG. 4) of the positive electrode tab portion 40 overlaps a through-hole formed in the first tab portion and a bolt passes through the through-holes. Further, a nut is threaded to the bolt. Accordingly, the positive electrode tab portion 40 (the positive electrode busbar 42) and the first tab portion (the positive electrode conductive plate) are electrically connected to each other.

One end of the positive electrode conductive plate covers a top face of the positive electrode terminal block 26. The one end is provided with a through-hole and a screw to be threaded into the screw hole passes through the through-hole. By the screw, the positive electrode conductive plate and the positive electrode terminal 32 are electrically connected to each other. Consequently, the positive electrodes of the capacitor elements 12 are electrically connected to the positive electrode terminal 32 through the positive electrode busbar 42 and the positive electrode conductive plate.

Similarly, the negative electrodes of the capacitor elements 12 are electrically connected to the first negative electrode terminal 34 and the second negative electrode terminal 36 through a negative electrode busbar 48 having four negative electrode tab portions 46 and a negative electrode conductive plate (not illustrated) including four second tab portions. That is, the second tab portion overlaps the negative electrode tab portion 46. A through-hole 50 (see FIG. 4) formed in the negative electrode tab portion 46 overlaps a through-hole formed in the second tab portion and a nut is threaded to a bolt passing through the through-holes. Accordingly, the negative electrode tab portion 46 (the negative electrode busbar 48) and the second tab portion (the negative electrode conductive plate) are electrically connected to each other.

One end of the negative electrode conductive plate covers a top face of the first negative electrode terminal block 28 and the other end thereof covers a top face of the second negative electrode terminal block 30. The ends thereof are provided with through-holes and a screw passing through the through-holes is threaded into the screw holes 38 and 39. In accordance with the threading, the negative electrodes of the capacitor elements 12 are electrically connected to the first negative electrode terminal 34 and the second negative electrode terminal 36 through the negative electrode busbar 48 and the negative electrode conductive plate.

Figure 2:
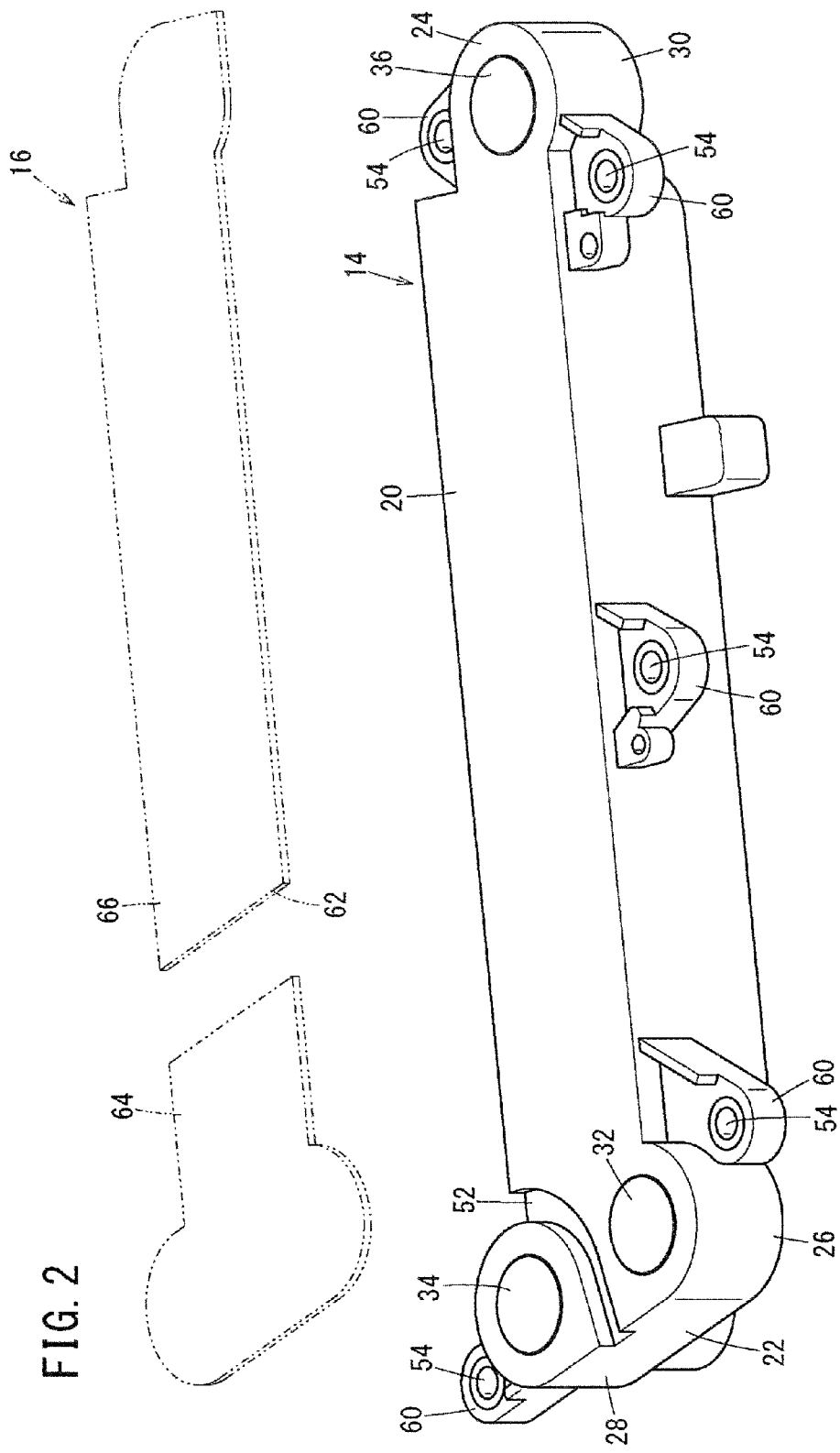
FIG. 2 is a schematic perspective view individually illustrating a main part of a heat radiation sheet and a casing constituting the capacitor unit when viewed from a bottom face.

FIG. 2 is a schematic perspective view illustrating a main part of the casing 14 when viewed from the bottom face. A notch groove 52 (a notch) is formed between the positive electrode terminal block 26 and the first negative electrode terminal block 28 in a bottom face of the first terminal block 22. That is, a gap between the positive electrode terminal block 26 and the first negative electrode terminal block 28 in the bottom face of the first terminal block 22 is depressed toward a top face in order to provide the notch groove 52 therein.

A plurality of tongue piece portions 60 (see FIG. 1) each having a through-hole 54 (see FIGS. 2 and 3) protrude in the horizontal direction from the bottom face of the casing 14. Although not illustrated in detail in the drawings, a screw passing through the through-holes 54 is threaded into a screw hole formed in the heat sink 18 so that the casing 14 is positioned to the heat sink 18.

Figure 3:
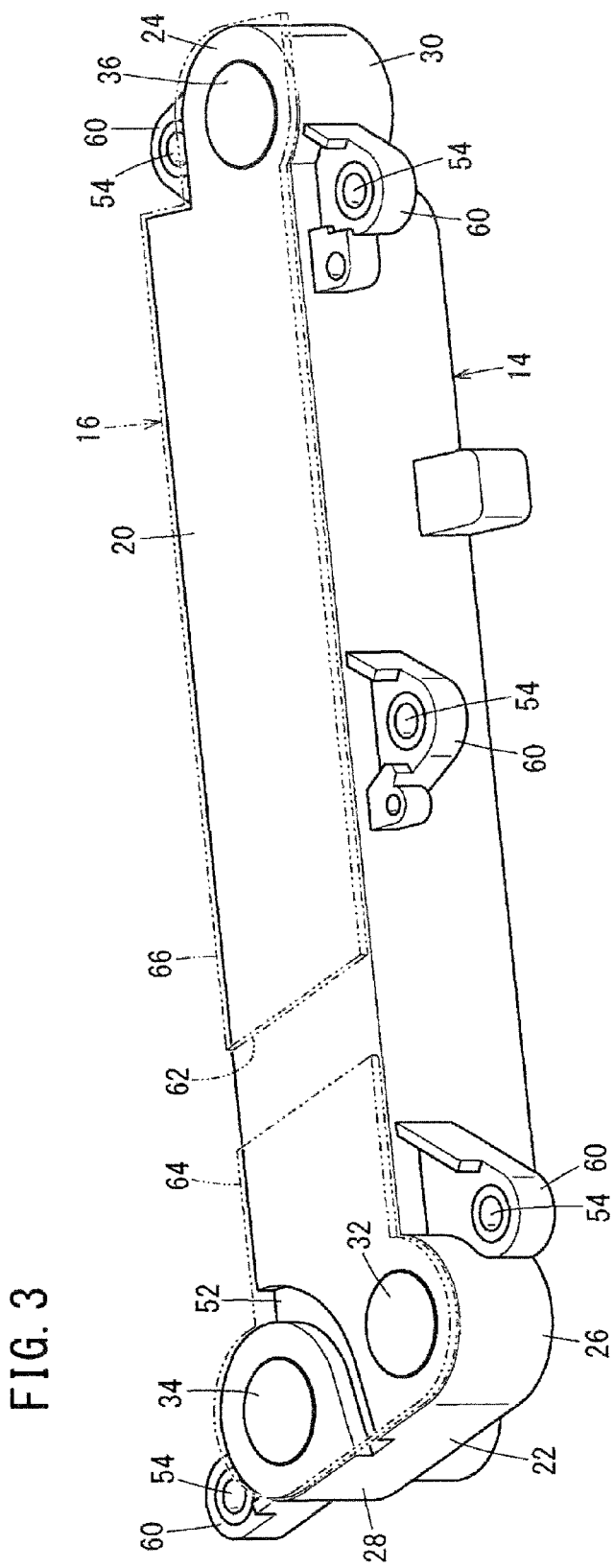
FIG. 3 is a perspective view illustrating a main part in a state where a heat radiation sheet is added to a bottom face of the casing when viewed from the bottom face.

The heat radiation sheet 16 illustrated in FIGS. 2 and 3 is interposed between the heat sink 18 and the casing 14. The heat radiation sheet 16 is interposed between the bottom face of the casing 14 and the heat sink 18 when the casing 14 is positioned and fixed to the heat sink 18. The heat radiation sheet 16 has large thermal conductivity. For this reason, heat generated by the capacitor element 12 and transmitted to the casing 14 is promptly transmitted to the heat sink 18 through the heat radiation sheet 16. In addition, the heat radiation sheet 16 is formed by an insulation body.

Here, the heat radiation sheet 16 is provided with a separation gap 62 serving as a notch formed in a direction orthogonal to the parallel direction (the longitudinal direction) of the capacitor element 12. For this reason, the heat radiation sheet 16 is separated into two sheets, that is, a first sheet 64 and a second sheet 66. The separation gap 62 is formed near the first terminal block 22 from the halfway in the longitudinal direction. In other words, the separation gap 62 is biased toward the end from the halfway in the parallel direction of the capacitor element 12.

The end of the first sheet 64 near the first terminal block 22 is formed in a shape corresponding to the shape of the bottom face of the first terminal block 22 and covers bottom faces of the first negative electrode terminal 34 and the positive electrode terminal 32 exposed from the bottom face of the first terminal block 22. Further, the end of the second sheet 66 near the second terminal block 24 is formed in a shape corresponding to the shape of the bottom face of the second terminal block 24 and covers a bottom face of the second negative electrode terminal 36 exposed from the bottom face of the second terminal block 24. Thus, the bottom faces of the positive electrode terminal 32, the first negative electrode terminal 34, and the second negative electrode terminal 36 are electrically insulated from one another.

The capacitor unit 10 according to the embodiment basically has the above-described configuration and the operation and effect thereof will be described below.

The capacitor unit 10 which has the above-described configuration is used while being assembled to a predetermined control circuit. Of course, at this time, a predetermined conductive wire is connected to the positive electrode terminal 32, the first negative electrode terminal 34, and the second negative electrode terminal 36 so that a current is supplied to the capacitor elements 12. In accordance with the supply of the current, the capacitor element 12 generates heat. The heat is transmitted to the outside of the casing 14 through the positive electrode busbar 42 and the positive electrode conductive plate or the negative electrode busbar 48 and the negative electrode conductive plate at the top face thereof. Meanwhile, the heat is radiated through the heat radiation sheet 16 and the heat sink 18 at the bottom face thereof.

By the above-described transmission or radiation of the heat, an excessive increase in temperature of the capacitor unit 10 is prevented. For this reason, the functions of the capacitor elements 12 are kept.

Additionally, the heat radiation sheet 16 is provided with the separation gap 62 which separates the heat radiation sheet 16 into the first sheet 64 and the second sheet 66, but the separation gap 62 is biased toward the end (the first terminal block 22) from the halfway in the parallel direction of the capacitor element 12. For this reason, the second sheet 66 covers the downside of the capacitor element 12 located at the halfway in the parallel direction among the capacitor elements 12. Thus, heat is promptly radiated from the capacitor element 12.

That is, the capacitor element 12 which is located at the halfway in the parallel direction generates heat therefrom and is adjacent to the other capacitor elements 12 generating heat. However, since the second sheet 66 exists therebelow with the casing 14 interposed therebetween, the above-described heat is promptly removed. For this reason, it is possible to prevent heat from staying at the capacitor element 12.

When the supply of the current to the capacitor element 12 is stopped so that a control using a control circuit is stopped, the heating of the capacitor element 12 is reduced. For this reason, the ambient temperature of the casing 14 decreases. In accordance with a decrease in temperature, dew condensation may occur in a minute gap between the bottom face of the casing 14 and the heat radiation sheet 16. In this case, there is a possibility that water droplets may spread along the gap.

Here, in the embodiment, the notch groove 52 is formed between the positive electrode terminal block 26 and the first negative electrode terminal block 28. For this reason, even when dew condensation occurs in the vicinity of the first terminal block 22 so that water droplets spread, the spreading water membrane is captured by the notch groove 52. That is, the further spreading of the water membrane is suppressed by the notch groove 52. As a result, a short-circuit between the positive electrode terminal 32 and the first negative electrode terminal 34 is prevented.

Further, the heat radiation sheet 16 is provided with the separation gap 62. Thus, when dew condensation occurs between the bottom face of the casing 14 and the first sheet 64 so that water droplets spread, the spreading water membrane cannot move toward the second sheet 66 beyond the separation gap 62. Similarly, when dew condensation occurs between the bottom face of the casing 14 and the second sheet 66 so that water droplets spread, the spreading water membrane cannot move toward the first sheet 64 beyond the separation gap 62. For this reason, the short-circuit between the positive electrode terminal 32 and the second negative electrode terminal 36 is prevented.

As described above, since the casing 14 or the heat radiation sheet 16 is provided with the notch (the notch groove 52 and the separation gap 62), the short-circuit between the positive electrode terminal 32 and the first negative electrode terminal 34 or the second negative electrode terminal 36 is prevented. For this reason, a current supply path in the capacitor unit 10 is normally kept at the start of the next control of the control circuit, in other words, the supply of the current to the capacitor element 12. Thus, a predetermined function of the capacitor element 12 is kept.

The invention is not limited to the above-described embodiments and various modifications can be made without departing from the spirit of the invention.

Figure 4:
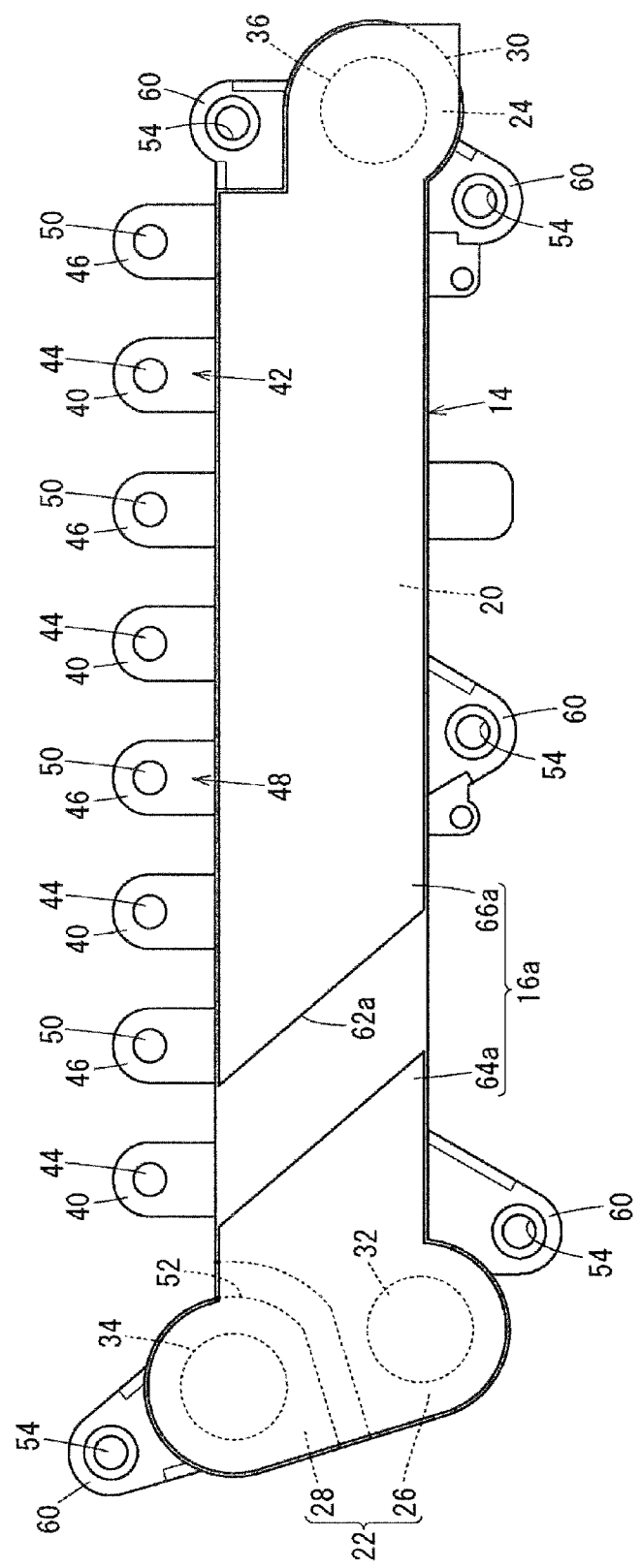
FIG. 4 is a perspective view illustrating a main part in a state where a heat radiation sheet constituting a capacitor unit according to another embodiment is added to a bottom face of a casing when viewed from the bottom face.

For example, as illustrated in FIG. 4, a separation gap 62a that separates a heat radiation sheet 16a into a first sheet 64a and a second sheet 66a may be formed to be inclined with respect to the longitudinal direction. In this case, the separation gap 62a is provided across two positions, that is, the capacitor element 12 which is located at the end near the first terminal block 22 in the parallel direction and the capacitor element 12 which is adjacent thereto. Thus, since the heat generated by two capacitor elements 12 is equalized, a so-called hot spot is not easily formed.

Figure 5:
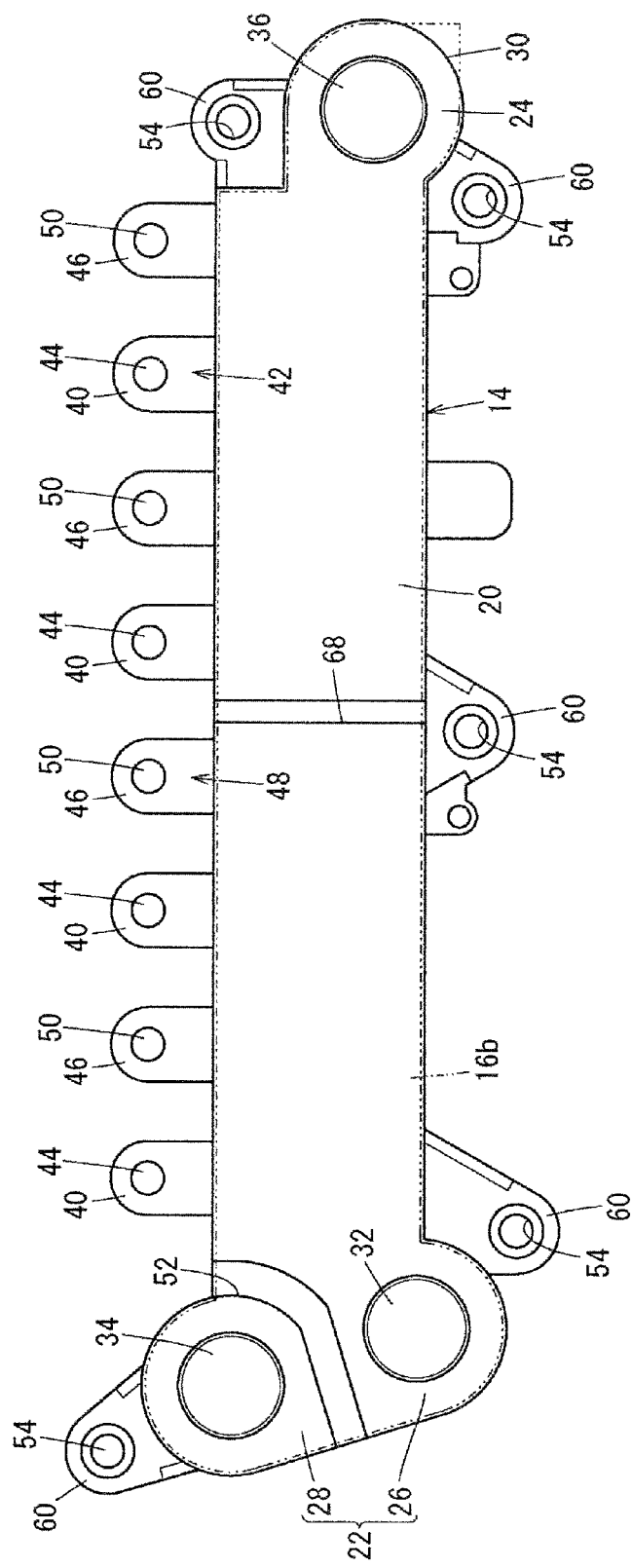
FIG. 5 is a perspective view illustrating a main part of a casing constituting a capacitor unit according to still another embodiment when viewed from a bottom face.

Further, as illustrated in FIG. 5, a second notch groove 68 is formed between the first terminal block 22 and the second terminal block 24 in the casing 14. Even in this case, the short-circuit between the positive electrode terminal 32 and the second negative electrode terminal 36 can be prevented. This is because the spreading water membrane is captured by the second notch groove 68 even when the water droplets spread in the longitudinal direction of the casing 14.

Further, in this case, when the second notch groove 68 is formed directly below the capacitor element 12, there is concern that the capacitor element 12 may be exposed from the casing 14 in accordance with the depth of the second notch groove 68. In order to remove the concern, it is desirable that the second notch groove 68 be formed between the adjacent capacitor elements 12.

Further, in this case, there is no need to form the separation gaps 62 and 62a (see FIGS. 2 to 4) and the like in the heat radiation sheet 16b. That is, one heat radiation sheet 16b may be used to cover the entire bottom face of the casing 14. Of course, as illustrated in FIG. 2 or 4, the heat radiation sheets 16 and 16a provided with the separation gaps 62 and 62a may be used.

Further, in the above-described embodiments, both the notch groove 52 and the separation gap 62 are formed, but any one of them may be formed. The positions are also not limited to the positions illustrated in FIGS. 2 to 5.

According to the embodiment, there is provided a capacitor unit including a casing accommodating a plurality of capacitor elements in parallel and including a positive electrode terminal block provided with positive electrode terminals electrically connected to positive electrodes of the capacitor elements and a negative electrode terminal block provided with negative electrode terminals electrically connected to negative electrodes of the capacitor elements, the capacitor unit including: a heat sink that radiates heat from the capacitor element; and a heat radiation sheet that is formed by an insulation body and is interposed between the casing and the heat sink to cover the positive electrode terminal block and the negative electrode terminal block, wherein a notch is formed in at least one position between the negative electrode terminal block and the positive electrode terminal block of at least one of the casing and the heat radiation sheet.

In this configuration, when dew condensation occurs between the casing and the heat radiation sheet and water droplets spread along a minute gap between the casing and the heat radiation sheet, the further spreading of the water membrane is suppressed by the notch. As a result, the spreading water membrane cannot easily spread beyond the notch.

Thus, it is possible to prevent a short-circuit between the positive electrode terminal and the negative electrode terminal through the spreading water membrane. That is, since the notch is formed to suppress the spreading of the water membrane, it is possible to remove the concern of the short-circuit between the positive electrode and the negative electrode of the capacitor element.

Further, the notch can be formed by a simple work. That is, the capacitor unit does not increase in size or does not become complex when the notch is formed. Furthermore, an increase in cost is not caused.

The notch can be formed in, for example, the heat radiation sheet. In this case, the heat radiation sheet is separated into a plurality of sheets by the notch.

In this case, it is desirable to form the notch at the end from the halfway in the parallel direction of the capacitor element. The capacitor which is located at the halfway in the parallel direction generates heat therefrom and also receives heat generated from the other adjacent capacitors. For this reason, heat easily stays at the halfway in the parallel direction. On the contrary, when the heat radiation sheet is located below the capacitor located at the halfway in the parallel direction, the heat around the capacitor can be promptly removed. For this reason, heat cannot easily stay.

For example, the notch may be formed in a direction orthogonal to the parallel direction of the capacitor element, but may be formed to be inclined with respect to the parallel direction. In this case, the notch may be provided across two adjacent capacitor elements. At a position where the notch is formed in the heat radiation sheet, heat is not easily generated from the casing compared to a position where the notch is not formed. For this reason, there is a tendency that a so-called hot spot is formed. On the contrary, when the notch is formed across two capacitor elements as described above, the heat generated by two capacitor elements is equalized. As a result, there is an advantage that the hot spot is not easily formed.

Alternatively, the notch may be formed in the casing. In this case, the notch can be formed as, for example, a bottomed groove.

Here, when the groove is formed directly below the capacitor element, there is concern that the bottom face of the capacitor element is exposed in accordance with the depth of the groove. In order to prevent this problem, it is desirable to form the groove between the adjacent capacitor elements.

Of course, the notch may be formed in both the heat radiation sheet and the casing. In this case, the heat radiation sheet is separated into a plurality of sheets by the notch and the casing is provided with a groove serving as the notch.

According to the embodiment, the notch is formed at a position between the positive electrode terminal and the negative electrode terminal of at least one of the heat radiation sheet and the casing constituting the capacitor unit. In this configuration, even when dew condensation occurs between the casing and the heat radiation sheet so that water droplets spread, the water membrane does not easily spread beyond the notch. That is, the further spreading of the water membrane is suppressed.

As a result, it is possible to prevent the short-circuit between the positive electrode terminal and the negative electrode terminal through the water membrane.

Obviously, numerous modifications and variations of the present invention are possible in light of the above teachings. It is therefore to be understood that within the scope of the appended claims, the invention may be practiced otherwise than as specifically described herein.

What is claimed is:

1. A capacitor unit comprising:
   capacitors including positive electrodes and negative electrodes;
   a casing accommodating the capacitors and comprising:
      a positive electrode terminal block having a positive electrode terminal which is electrically connected to the positive electrodes of the capacitors; and
      a negative electrode terminal block having a negative electrode terminal which is electrically connected to the negative electrodes of the capacitors;
   a heat sink provided on the casing in a stacking direction to radiate heat from the capacitors;
   a heat radiation sheet made of insulation material and sandwiched in the stacking direction between the casing and the heat sink to cover the positive electrode terminal block and the negative electrode terminal block; and
   a notch provided in at least one of the casing and the heat radiation sheet between the negative electrode terminal block and the positive electrode terminal block, the notch passing through the at least one of the casing and the heat radiation sheet along a plain substantially perpendicular to the stacking direction to separate the negative electrode terminal block and the positive electrode terminal block.

2. The capacitor unit according to claim 1, wherein the capacitors are arranged in parallel.

3. The capacitor unit according to claim 1, wherein the notch is formed in the heat radiation sheet and the heat radiation sheet is separated into a plurality of sheets by the notch.

4. The capacitor unit according to claim 2, wherein the notch is biased toward an end from a halfway in the parallel direction of the capacitors.

5. The capacitor unit according to claim 2, wherein the notch is inclined with respect to the parallel direction of the capacitors and is formed across two adjacent capacitors.

6. The capacitor unit according to claim 1, wherein the notch is a groove formed in the casing.

7. The capacitor unit according to claim 6, wherein the groove is formed between the adjacent capacitors.

8. The capacitor unit according to claim 1, wherein the notch is formed in both the heat radiation sheet and the casing, the heat radiation sheet is separated into a plurality of sheets by the notch, and the casing is provided with a groove serving as the notch.

9. A capacitor casing structure comprising:
   a casing to accommodate capacitors and comprising:
      a positive electrode terminal block having a positive electrode terminal to be electrically connected to positive electrodes of the capacitors; and
      a negative electrode terminal block having a negative electrode terminal to be electrically connected to negative electrodes of the capacitors;
   a heat sink provided on the casing in a stacking direction to radiate heat from the capacitors;
   a heat radiation sheet made of insulation material and sandwiched in the stacking direction between the casing and the heat sink to cover the positive electrode terminal block and the negative electrode terminal block; and
   a notch provided in at least one of the casing and the heat radiation sheet between the negative electrode terminal block and the positive electrode terminal block, the notch passing through the at least one of the casing and the heat radiation sheet along a plain substantially perpendicular to the stacking direction to separate the negative electrode terminal block and the positive electrode terminal block.

* * * * *